United States Patent Office 3,205,054
Patented Sept. 7, 1965

3,205,054
ABRASIVE COATED MATERIAL
Philip C. Tucker, Westboro, Mass., assignor to Bay State Abrasive Products Company, Westboro, Mass., a corporation of Massachusetts
No Drawing. Filed Jan. 20, 1964, Ser. No. 338,580
4 Claims. (Cl. 51—298)

This application is a continuation-in-part of my copending application Serial No. 64,701, filed October 25, 1960, now abandoned.

The present invention relates to abrasive-coated materials and to products formed therefrom. More particularly, the present invention is concerned with novel abrasive-coated materials produced as sheets or webs and with flexible abrasive articles such as abrasive belts, discs, and the like formed from or utilizing such novel materials.

It is an object of the present invention to provide abrasive-coated materials as sheets or webs which are characterized by the exceptionally strong adhesive bond with which the abrasive granules or particles are held on the backing.

Another object of the present invention is to provide abrasive-coated materials of the character described above which may be rapidly produced with conventional equipment but require only relatively inexpensive equipment.

A further object of the present invention is to provide abrasive-coated materials of the character described above that may be readily formed into abrasive articles.

Still another object of the present invention is to provide abrasive articles and products which have outstanding cutting rates.

Other objects and advantages of the present invention will be apparent from the following detailed description thereof.

Abrasive-coated materials and products have been known and used for many years. Adhesives of many types have been employed in the making of such materials. Among the most widely used adhesives are glue, soluble silicates, varnishes, and synthetic resins. The previously used adhesives have, however, disadvantages which render them unsuitable for certain uses. Thus, glue is water-soluble and therefore cannot be used in making abrasive articles or products which may encounter moist conditions. Soluble silicates are, as the name indicates, also water-soluble and have a tendency toward excessive brittleness. Furthermore, they tend to deteriorate by reaction with the carbon dioxide of the surrounding air over prolonged periods of exposure. Although varnishes and thermoplastic synthetic resins are resistant to water, they tend to become sticky or gummy in use so that the abrasive surface loads up excessively. On the other hand, thermosetting synthetic resins, while used on a large scale since they do not become gummy in use, are inconvenient because they require long curing cycles of several hours or longer to obtain the necessary strength. Similar inconvenience is encountered with glue, silicate, and varnish adhesives because of the long times required for complete curing.

It has now been found possible to produce abrasive-coated materials suitable for the making of abrasive articles such as abrasive bands and belts, abrasive discs, and the like, by the use of adhesives that may be completely cured in only a few minutes. Moreover, such adhesives have excellent bonding characteristics with abrasive grain and the various backing materials that may be employed as well as exceptional strength and water resistance without objectionable brittleness when they are cured.

The adhesives used in producing abrasive-coated materials according to the present invention are liquid compositions based on the class of materials commonly known as epoxy resins. More properly perhaps the epoxy materials employed in the practice of the present invention should be referred to as resin-forming polyepoxides since, as will be explained below, the epoxy containing component of the adhesive composition employed herein to be useful should have on the average two or more reactive epoxy groups per molecule, and must in the unreacted state be a relatively free flowing liquid at room temperature. As used herein the term "epoxy" is in common with the resin art restricted to that variant where the "oxygen linked in a chain of carbon atoms to two of these atoms" is linked to two adjacent carbon atoms at a terminal position, e.g.

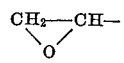

As is well known in the art this three membered oxygen containing ring (often referred to as an oxirane ring) is highly reactive, especially in the presence of compounds containing an active hydrogen atom, such as amines, acids, phenols, alcohols, thiols and the like, and will react readily with such compounds by forming a secondary alcohol. Such reactions tend to be autocatalytic and exothermic. If both the epoxy containing component and the active hydrogen containing component are polyfunctional the reaction tends to run to completion (until one or the other of the compounds is completely reacted) forming resins of a high molecular weight. In common with all such addition polymerization reactions di-functional components lead to a linear and hence thermoplastic resin; components which have tri, tetra, or higher functionality lead to highly cross linked and hence thermoset resins; and mono-functional components act as chain stoppers.

Resin forming polyfunctional epoxides typically are produced by the reaction of glycidyl compounds such as epichlorohydrin with polyhydric phenols in the presence of an alkali forming a polyglycidyl ether of a polyhydric phenol. The most common of the resin forming epoxides are the reaction products of epichlorohydrin with bis-(4-hydroxyphenyl)2,2-propane (bisphenol A). The manner in which the polyepoxides employed in the present invention are prepared, or even within limits, the chemical nature of such polyepoxides is of no particular importance provided such material has a sufficient epoxide functionality and is a liquid. The liquid reaction products employed in the present invention necessarily have a low molecular weight.

The various requirements for the adhesive component employed in the present invention may best be understood by considering a typical procedure for manufacturing abrasive-coated material according to the present invention.

TYPICAL PROCEDURE

A web of heavy cotton drills presized with a mixture of glue, dextrin and starch is fed through a conventional abrasive coating apparatus (such, for example, as is shown schematically in FIGURE 5 of U.S. Patent No. 2,337,445 except that no festooner is employed) where a making adhesive coat is applied thereto at substantially room temperature in an amount equivalent to about 0.0035 to 0.05 lb./ft.$^2$ of the web. Abrasive particles e.g. aluminum oxide particles are then evenly deposited on the adhesive coating at a rate of from about 0.025 to 0.3 lb./ft.$^2$. After this, the coated web is treated by suitable conventional means to shake off loose abrasive particles and to partially orient and seat the firmly adhering particles in the adhesive. The web is then passed horizontally through an oven heated by suitable means to an elevated temperature at such a speed that any point thereon remains in the heated zone of the oven for not more than 10 minutes and preferably 5 minutes or less. This latter is one of the basic requirements and advantages of the present process since it is desired herein to produce coated abrasive products using an oven of reasonable size without festooning. The coated web is normally wound into rolls.

A coating of a sizing adhesive is then applied to the web over the abrasive particles using suitable conventional apparatus, such as that described above. The sizing adhesive is maintained at substantially room temperature and is applied to the abrasive coated web in an amount equivalent to about 0.004 to 0.055 lb./ft.$^2$. Final curing of the adhesive on the web is achieved by passing the web horizontally through an oven heated to an elevated temperature at such rate that no point on the web remains in the hot zone of the oven for more than 10 minutes, and preferably five minutes or less. After the web is cooled abrasive sheets may be cut from the web, or abrasive articles, such as belts, discs, and the like, may be formed therefrom.

As can be seen from the above described process for making the coated abrasive products of the present invention, and from a consideration of the required properties of the finished abrasive products, the necessary properties of the maker and of the sizing adhesive are quite stringent. These include:

(1) That the two adhesive coats must bond firmly together, even though separately applied and cured;

(2) That each coating of adhesive must harden completely in a very short period of time at a temperature that is not destructive to the adhesive or to the backing and must upon initial cooling not be tacky.

(3) That the abrasive grain in the finished product must be firmly attached in a fixed position relative to the backing in such manner as not to be dislodged under conditions of use. This requires that the cured adhesive be water, solvent, and oil resistant, be rigid and have a heat-distortion temperature (HDT) as elevated as possible and at least as high as any temperature to which the abrasive product may be heated under conditions of use. On the other hand, the cured adhesive coating should be tough enough to hold the abrasive grain but sufficiently friable to permit mechanical flexing and to wear away with the attrition of the abrasive grain.

(4) That the uncured adhesive composition have a reasonable pot life of the coating temperature.

(5) That the adhesive composition must be free of any volatile component at any temperature up to and including the curing temperature, and must cure without giving off any volatile products of reaction.

(6) That the uncured adhesive composition have a low and controllable viscosity under application conditions so that a proper thickness may be applied to the backing at each stage. In connection with the maker adhesive coating the viscosity should be such as to result in a coating thick enough to hold the abrasive grains in both the cured and uncured state, but not so thick as to vary the grain. In connection with the sizer coating adhesive the viscosity must be such that the sizer adhesive will drain away from the points of the abrasive grain and will augment the maker adhesive increasing the base adhesion and the mechanical strength.

To a large degree, therefore, the necessary viscosity for each adhesive composition is controlled by the size of the abrasive grain to be applied to the backing. The smaller the grit, the lower must be the viscosity. In addition the viscosity of the uncured sizer coating should be lower than that of the maker coating. Typical operable coating viscosities are given in the following table, it being understood that the values given represent a suitable standard, and that a range of viscosities would be operable in each instance:

| Grit Size | Maker coating, c.p.s. | Sizer coating, c.p.s. |
|---|---|---|
| 20–40 inclusive | 3,000 | 1,500 |
| 50–100 inclusive | 2,000 | 1,000 |
| 120–150 inclusive | 1,500 | 250–400 |

All viscosities are given in centipoise at 76° F.

To satisfy these various requirements the permissible range of suitable components for useful adhesive compositions is, of course, rather limited. The epoxy-hardener system must be very reactive to achieve complete cure in the limited time available, must be of low average molecular weight to be sufficiently liquid before cure, should preferably be highly functional to result in the required thermoset cured product, and should preferably be highly aromatic in order to achieve the high heat distortion temperature desired.

A preferred polyepoxide is the trifunctional epoxide having the formula—

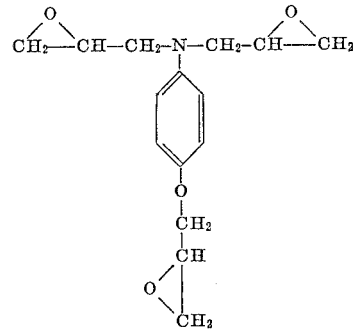

This material is disclosed in U.S. Patent 2,951,825 and is sold by Union Carbide Company under the trade designation ERLA 0500. This trifunctional epoxide is aromatic, has an epoxy assay of 100–125 grams per gram mole, a viscosity of 2,000 to 5,000 centipoises at 77° F. and contains a built in tertiary amine catalyst which tends to promote its activity. This resin cures in the presence of substantially stoichiometric amounts of amine hardeners to a very hard intractible resin having a relatively high heat distortion temperature.

More conventional epoxide compositions formed from the reaction of epichlorohydrin and a diphenol are useful but not as desirable since such epoxides have a lower degree of functionality leading to a less highly cured system and generally have a higher viscosity than is desirable. When mixed with a lower viscosity polyepoxide such resins are quite useful especially for the sizer coating. A typical such resin sold under the trade designation ERLA 2256 and supplied by Union Carbide Company which has been tested and found to be useful is understood to be a mixture of about 65% of a conventional, low molecular weight epichlorohydrin-bisphenol A reaction product (ERLA 2774) and about 35% EP 205, a dicyclo diepoxy carboxylate produced by a peracetic acid treatment process. ERLA 2256 has a viscosity of about 700 centipoise at 77° F. and an epoxy assay of about 140 grams per gram mole.

Other low viscosity diepoxides may be employed for viscosity adjustment purposes with satisfactory results. The preferred such reactive diluent is resorcinol diglycidyl ether (RDE)

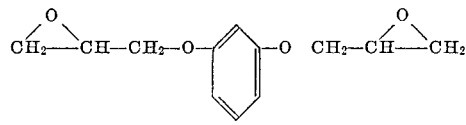

which has a viscosity of 500 centipoises at 77° F. Another preferred diluent is butadiene dioxide

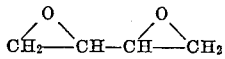

which has a viscosity of 1.4 centipoises at 77° F. and a boiling point of 144.5° C. at normal atmospheric pressure. Of the two, resorcinol diglycidyl ether is preferred because of its aromatic content and its relative ease of handling. Mixtures of resorcinol diglycidyl ether and butadiene dioxide are especially useful since the addition of butadiene dioxide to the resorcinol diglycidyl ether reduces the relatively high freezing point of the latter.

Minor proportions of mono-functional liquid epoxides such as phenyl glycidyl ether, allyl glycidyl ether and butyl glycidyl ether may be used as viscosity depressants. However, these reactive diluents are less desirable since because of their mono-functionality they tend to short stop the reaction and to reduce the molecular weight of the reaction product.

In general it is desirable to maintain the average functionality of the epoxide component to a level of two epoxide groups per molecule or higher, especially in the case of the maker adhesive composition for which the maximum cured strength is desired.

Because of the need for a complete cure in a short time at reasonable temperatures with the absence of any gaseous reaction products amine curing systems are preferred. The amine curing system or amine hardener is normally used in substantially a stoichiometric amount based on the entire composition (both maker and sizer coatings) in order to insure a complete cure. It has been found, however, that the adhesion between the maker and the sizer coatings is improved somewhat if an amount of hardener somewhat less (up to 15 to 20% or so) than the stoichiometric amount is used in the maker coating and the deficiency supplied by using an amount of hardener in the sizer coating which is somewhat in excess (up to 10 to 15% or so) of the stoichiometric amount. A large excess of amine is avoided to prevent bleeding.

In general the aromatic polyamines are preferred since such amines result in a cured product having the highest heat distortion temperature. However, the curing rate of the system is somewhat slower with an aromatic polyamine than with an aliphatic polyamine, and in addition the aromatic polyamines tend in general to be solids. In view of the critical viscosity requirements of the system it is essential that both the epoxide component and the polyamine component be liquid.

The aliphatic polyamines on the other hand while they in general are liquids, are good solvents for the aromatic amines, and accelerate the curing reaction, promote a condition during cure which is not clearly understood and which can only be described as the formation of bubbles at the interface in the cured resin mass. Such bubbles which are microscopic in size tend to form between the coating and the backing and seriously weaken the bond between the abrasive grain and the backing.

As will be seen below it appears necessary to use in the amine curing system at least about 20% by weight of aliphatic amines to 80% by weight of aromatic amines to achieve a stable liquid amine component and to obtain a sufficiently rapid rate of reaction. On other hand, not more than about 57% by weight of aliphatic amines to 43% by weight of aromatic amines and preferably not more than about 47% by weight of aliphatic amines to 53% by weight of aromatic amines should be used because of the formation of bubbles at the interface.

The preferred aromatic polyamines are o-, m-, and p-phenylene diamine; 4,4-diamino diphenyl methane; 2,4-toluene diamine; methylene dianiline, and benzyl dimethylamine. In order to achieve a balance of properties mixtures of several of these amines are normally used. The phenylene diamines give the highest heat distortion temperature, but are difficultly soluble. Of the phenylene diamines the para form gives the highest heat distortion temperature, but is the most difficult to dissolve; the meta form while the easiest to dissolve, gives the lowest heat distortion temperature of the three; and the ortho form is intermediate in both properties. Another solid aromatic polyamine which gives notably high heat distortion temperatures to the cured mass is 4,4-diamino diphenyl methane. Of the group only benzyl dimethyl amine is a liquid though not a particularly good solvent for the other aromatic polyamines. While benzyl dimethylamine does not give a cured product with as high a heat distortion temperature as do the other aromatic polyamines it does act as a latent hardener.

The preferred aliphatic amines include ethylene diamine, diethylene triamine, triethylene tetramine, tetraethyl pentamine, N-2-hydroxyl propyl ethylene diamine, hydroxy ethyl ethylene diamine, 3,3-amino-bis-propyl amine and menthane diamine. Boron trifluoride monoethylamine has also been used, but appears to contribute heavily to the bubble forming condition. Of all of the aliphatic amines menthane diamine gives a resin having the highest heat distortion temperature (though not as high as any of the aromatic amines) and has a moderately fast curing rate. Diethylene triamine and hydroxyethyl ethylene diamine appear to have the fastest curing rates. N-2-hydroxyl propyl ethylene diamine appears, though this is not certain, to contribute somewhat to the bubble forming condition. All of the aliphatic amines mentioned are liquid and all act as solvents for the solid aromatic amines. Normally a mixture of the aliphatic amines is used in order to obtain a balance of the individual properties.

A third ingredient in the composition is a minor amount (1 to 12% by weight of the total composition) of a finely divided inert filler. The function of the filler is twofold. In the liquid state it is employed as a viscosity or plasticity adjusting agent not only to give the composition body to impede separation of the ingredients, but also to give the adhesive composition itself sufficient body to coat the backing properly. In the cured state the filler particles act as break points in the highly cured resin mass insuring that the coated abrasive article will craze rather than crack when flexed, and improves the friability and wear resistance of the mass. Any number of inert finely divided fillers may be used for the purpose including silica, aluminum and calcium silicate, natural clays and the like, provided in each case that the material is dry and non-hygroscopic so that moisture which can cause the formation of bubbles in the mass during cure is not introduced into the composition. Preferably the particle size of the filler is below 5 microns in order that the maximum viscosity-plasticity effect may be achieved.

*Example 1*

MAKER ADHESIVE

In the preferred maker adhesive composition 1115 grams of ERLA 0500 was blended with 370 grams of resorcinol diglycidyl ether (RDE) on a roll mill. The viscosity of the epoxide blend was adjusted to 4600 cps. at 76° F. with 208 grams of aluminum silicate. The hardener formulation was prepared by blending 100 grams of menthane diamine, 75 grams of hydroxyethyl ethylene diamine, 125 grams of benzyldimethylamine and 75 grams each of o- and m-phenylene diamine (61.1% aromatic amines, 38.9% aliphatic amines) the viscosity of the hardener blend was adjusted with 25 grams of calcium silicate. The hardener blend was then mixed with the epoxide blend, resulting in an adhesive composition having a viscosity of 1800 cps. at 76° F.

This mixture was applied to the backing at a rate of 10.4 pounds per ream (a ream being 500, 9" x 11" sheets). Abrasive grain was supplied at a rate of 97.4 pounds per ream and the coated backing was cured at 300° F. for five minutes.

Example 1

SIZER ADHESIVE COMPOSITION

For the sizer coat 507 grams of ERLA 0500 was blended with 1717 grams of resorcinol diglycidyl ether and the viscosity of the blend was adjusted to 1500 cps. at 76° F. with 44.5 grams of calcium silicate. The hardener formula was prepared by blending 95 grams of diethylene triamine, 95 grams of hydroxyethyl ethylene diamine, 151.4 grams of menthane diamine, 95 grams of p-phenylene diamine, 122.8 grams of m-phenylene diamine and 202.3 grams of benzyl dimethylamine (55% aromatic, 45% aliphatic). 39.4 grams of calcium silicate were added as a viscosity stabilizer. The epoxide blend and the hardener mixture were blended forming a sizer adhesive coating having a viscosity of 650 cps. at 77° F. The sizer coating was applied to the coated product of Example 1 (M) at a rate of 20.4 pounds per ream and the coated product cured at 340° F. for four minutes.

The resulting coated abrasive product was formed into an abrasive belt and was compared with a conventional abrasive belt made using the same backing and grit, but with a phenolic maker and sizer adhesive with the following comparative results:

| Material ground | Belt of invention, percent | Conventional belt, percent |
|---|---|---|
| Die cast instrument cases | 200 | 100 |
| Steel rod: | | |
|   Comparison A | 110 | 100 |
|   Comparison B | 200 | 100 |
| Stainless steel parts: | | |
|   Cutting rate | 300 | 100 |
|   Life | 200 | 100 |
| High speed tool steel pins (deburring operation) | 133 | 100 |
| Steel tubing (deburring, mark removal) (life) | 114 | 100 |

To determine the effect of varying proportions of aliphatic amine a series of tests were made following the procedure of Example 1 varying only in the relative proportion of the various amines in the hardener system. These various experiments are presented in tabular form below with proportions expressed as percent by weight of the hardener system. The heading S or M in each column indicates whether the amine composition was used in the sizer or the maker adhesive of Example 1:

The results were as follows:

Example 2—bubbling at interface, mass soft when hot (low HDT)

Example 3—severe bubbling at interface—tacky when first cooled

Example 4—bubbling at interface, tacky when first cooled

Examples 5 and 6—slight but marginally acceptable bubbling at interface—acceptable HDT, very hard and tough when cold Examples 7 and 8—no bubbling at interface, high HDT, very hard and tough when cold Example 9—required 10% additional time to achieve complete cure, no bubbling at interface, high HDT, very hard and tough when cold Example 10—required 25% additional time to achieve complete cure, the solid constituents tend to recrystallize out of solution after a short time (less than 1 hour), otherwise acceptable cure The following examples are typical of satisfactory adhesive compositions having varying coating viscosities. Unless otherwise noted the procedure in each case is the same as in Example 1.

Example 11 (M):
  Epoxide composition—    Grams
    0500 _____ 743
    RDE _____ 742
    Aluminum silicate _____ 208
    Viscosity at 76° F., 4500 cps.
  Hardener composition—
    Same as Example 1 (M).
    Coating viscosity 1175 cps. at 76° F.
    Cured for 5 minutes at 300° F.

Example 11 (S):
  Epoxide composition—    Grams
    0500 _____ 445
    RDE _____ 1780
    Calcium silicate _____ 44.5
    Viscosity at 76° F., 1425 cps.
  Hardener composition—
    Same as Example 1 (S).
    Coating viscosity 450 cps. at 78° F.
    Cure for 4 minutes at 340° F.
  Coating weights—    Lbs./ream
    Maker _____ 8
    Grain _____ 74.8
    Sizer _____ 19

| | 2 S | 3 M | 4 M | 5 M | 6 M | 7 M | 8 M | 9 M | 10 M |
|---|---|---|---|---|---|---|---|---|---|
| ALIPHATIC: | | | | | | | | | |
| (1) Menthane diamine | 19.8 | 26.7 | 26.7 | 25.0 | 20.0 | 25.0 | 22.2 | 15.6 | ---- |
| (2) Diethylene triamine | 31.2 | ---- | ---- | ---- | ---- | ---- | ---- | ---- | ---- |
| (3) Boron trifluoride monoethylamine | ---- | 3.3 | ---- | ---- | ---- | ---- | ---- | ---- | ---- |
| (4) N-(2-hydroxy propyl) ethylene diamine | 16.2 | 13.4 | 13.3 | 12.5 | 13.3 | ---- | ---- | ---- | ---- |
| (5) Hydroxyethyl ethylene diamine | ---- | 20.0 | 20.1 | 18.8 | 20.0 | 18.7 | 16.6 | 9.5 | ---- |
| Aliphatic total, percent | 67.2 | 63.4 | 60.1 | 56.3 | 53.3 | 43.7 | 38.8 | 25.1 | 0 |
| AROMATIC: | | | | | | | | | |
| (6) Benzidimethylamine | 10.4 | 10.0 | 13.3 | 18.7 | 20.0 | 31.3 | 27.8 | 33.3 | 64 |
| (7) o-Phenylene diamine | ---- | 13.3 | 13.3 | 12.5 | 13.3 | 12.5 | 16.7 | 21.6 | 18 |
| (8) m-Phenylene diamine | 16.2 | 13.3 | 13.3 | 12.5 | 13.3 | 12.5 | 16.7 | 20.0 | 18 |
| (9) p-Phenylene diamine | 6.2 | ---- | ---- | ---- | ---- | ---- | ---- | ---- | ---- |
| Aromatic total, percent | 32.8 | 36.6 | 39.9 | 43.7 | 46.6 | 56.3 | 61.2 | 74.9 | 100 |

Example 12 (M):
    Epoxide composition— Grams
        0500 _____ 1485
        Aluminum silicate _____ 208
        Viscosity at 76° F., 4500 cps.
    Hardener composition—
        Same as Example 1 (M).
    Coating viscosity 1050 cps. at 80° F.
    Cure for 5 minutes at 300° F.

Example 12 (S):
    Epoxide composition— Grams
        0500 _____ 445
        RDE _____ 1780
        Calcium silicate _____ 44.5
    Hardener composition—
        Diethylene triamine _____ 95
        Hydroxyethyl ethylene diamine _____ 95
        Methylene dianiline _____ 131
        p-Phenylene diamine _____ 38
        m-Phenylene diamine _____ 48.9
        Menthane diamine _____ 151.4
        Benzyl dimethylamine _____ 202.3
        Calcium silicate _____ 39.35
    Coating viscosity 550 cps. at 84° F.
    Cure for 4 minutes at 340° F.
    Coating weights— Lbs./ream
        Maker _____ 9
        Grain _____ 60
        Sizer _____ 20

Example 13 (M):
    Epoxide composition— Grams
        0500 _____ 1115
        RDE _____ 370
        Aluminum silicate _____ 208
        Viscosity 76° F., 4600 cps.
    Hardener composition—
        Same as Example 1 (M).
    Coating viscosity 1500 cps. at 77° F.
    Cure for 5 minutes at 300° F.

Example 13 (S):
    Epoxide composition— Grams
        0500 _____ 508
        RDE _____ 1717
        Calcium silicate _____ 44.5
        Viscosity 76° F., 1350 cps.
    Hardener composition—
        Same as Example 1 (S).
    Coating viscosity at 76° F., 430 cps.
    Cure for 4 minutes at 340° F.
    Coating weights— Lbs./ream
        Maker _____ 99
        Grain _____ 55
        Sizer _____ 14

Example 14 (M):
    Epoxide composition— Grams
        0500 _____ 1115
        RDE _____ 370
        Aluminum silicate _____ 208
        Viscosity at 76° F., over 5000 cps.
    Hardener composition—
        Same as Example 1 (M).
    Coating viscosity at 76° F., 1100 cps.
    Cure for 5 minutes at 300° F.

Example 14 (S):
    Epoxide composition— Grams
        0500 _____ 508
        RDE _____ 1717
        Calcium silicate _____ 44.5
        Viscosity at 72° F., 1900 cps.
    Hardener composition—
        Same as Example 1 (S).
    Coating viscosity at 78° F., 580 cps.
    Cure for 4 minutes at 340° F.

Example 14 (S)—Continued
    Coating weights— Lbs./ream
        Maker _____ 6
        Grain _____ 40
        Sizer _____ 20

Example 15 (M):
    Epoxide composition— Grams
        0500 _____ 891
        RDE _____ 297
        ERLA 2256 _____ 297
        Aluminum silicate _____ 208
        Viscosity at 76° F., over 5000 cps.
    Hardener composition—
        Same as Example 1 (M).
    Coating viscosity at 76° F., 1250 cps.
    Cure for five minutes at 300° F.

Example 15 (S):
    Epoxide composition— Grams
        0500 _____ 508
        RDE _____ 1717
        Calcium silicate _____ 44.5
        Viscosity at 76° F., 1400 cps.
    Hardener composition—
        Same as Example 1 (S).
    Coating viscosity at 84° F., 400 cps.
    Cure for 4 minutes at 340° F.
    Coating weights— Lbs./ream
        Maker _____ 8
        Grain _____ 39
        Sizer _____ 16.4

Example 16 (M):
    Epoxide composition— Grams
        0500 _____ 594
        RDE _____ 594
        2256 _____ 297
        Aluminum silicate _____ 297
        Viscosity at 76° F., 2450 cps.
    Hardener composition—
        Same as Example 1 (S).
    Coating viscosity 76° F., 875 cps.
    Cure for five minutes at 300° F.

Example 16 (S):
    Epoxide composition— Grams
        RDE _____ 1424
        2256 _____ 534
        Glycidyl methacrylate _____ 267
        Calcium silicate _____ 156
        Viscosity at 78° F., 670 cps.
    Hardener composition—
        Same as Example 1 (S).
    Coating viscosity at 77° F., 370 cps.
    Cure for 4 minutes at 340° F.
    Coating weights— Lbs./ream
        Maker _____ 8
        Grain _____ 30
        Sizer _____ 17.2

Example 17 (M):
    Epoxide composition— Grams
        0500 _____ 594
        RDE _____ 594
        2256 _____ 297
        Aluminum silicate _____ 297
        Viscosity at 76° F., 4500 cps.
    Hardener composition—
        Same as Example 1 (M).
    Coating viscosity at 76° F., 1150 cps.
    Cure for 5 minutes at 300° F.

Example 17 (S):
    Epoxide composition— Grams
        RDE _____ 1424
        2256 _____ 534
        Glycidyl methacrylate _____ 267
        Calcium silicate _____ 156
        Viscosity at 76° F., 750 cps.

Example 17 (S)—Continued
  Hardener composition—
    Same as Example 1 (S).
    Coating viscosity at 78° F., 300 cps.
    Cure for 4 minutes at 340° F.
  Coating weights— Lbs./ream
    Maker ------------------------------ 6
    Grain ------------------------------ 28
    Sizer ------------------------------ 8.6
Example 18 (M):
  Epoxide composition— Grams
    0500 ------------------------------ 568.8
    RDE ------------------------------- 629.6
    2256 ------------------------------ 286.6
    Aluminum silicate ----------------- 297
    Viscosity 76° F., 4900 cps.
  Hardener composition— Grams
    Methane diamine ------------------- 100
    Hydroxyethyl ethylenediamine ----- 75
    Benzyl dimethylamine -------------- 125
    o-Phenylene diamine --------------- 75
    m-Phenylene diamine --------------- 75
    Calcium silicate ------------------ 25
    Coating viscosity at 77° F., 1150 cps.
    Cure for 5 minutes at 300° F.
Example 18 (S):
  Epoxide composition— Grams
    RDE ------------------------------- 1424
    2256 ------------------------------ 534
    Glycidyl methacrylate ------------- 267
    Calcium silicate ------------------ 156
    Viscosity at 74° F., 820 cps.
  Hardener composition— Grams
    Diethylene triamine --------------- 95
    Hydroxylethyl ethylene diamine ---- 95
    p-Phenylene diamine --------------- 95
    Menthane diamine ------------------ 151.4
    m-Phenylene diamine --------------- 122.85
    Benzyl dimethylamine -------------- 202.3
    Calcium silicate ------------------ 39.35
    Coating viscosity at 76° F., 345 cps.
    Cure for 4 minutes at 340° F.
  Coating weights— Lbs./ream
    Maker ----------------------------- 7.4
    Grain ----------------------------- 19
    Sizer ----------------------------- 8.8
Example 19 (M):
  Epoxide composition— Grams
    0500 ------------------------------ 594
    RDE ------------------------------- 594
    2256 ------------------------------ 297
    Aluminum silicate ----------------- 297
    Viscosity at 76° F., 3600 cps.
  Hardener composition—
    Same as Example 18 (M):
    Coating viscosity at 76° F., 920 cps.
    Cure for 5 minutes at 300° F.
Example 19 (S):
  Epoxide composition— Grams
    RDE ------------------------------- 1186.5
    2256 ------------------------------ 445
    Glycidyl methacrylate ------------- 222.5
    Calcium silicate ------------------ 130
    Viscosity at 75° F., 640 cps.
  Hardener composition— Grams
    Diethylene triamine --------------- 79
    Hydroxylethyl ethylene diamine ---- 79
    p-Phenylene diamine --------------- 79
    Menthane diamine ------------------ 128.7
    m-Phenylene diamine --------------- 102.4
    Benzyldimethyl amine -------------- 168.5
    Calcium silicate ------------------ 33
    Coating viscosity at 76° F., 295 cps.
    Cure for 4 minutes at 340° F.

Example 19 (S)—Continued
  Coating weights— Lbs./ream
    Maker ----------------------------- 5.4
    Grain ----------------------------- 19.4
    Sizer ----------------------------- 8

While, as mentioned above, the adhesives employed herein will, at least partially, set up or cure at room temperatures, it has been found more satisfactory and is preferred to employ heat to hasten the cure. Any curing temperature up to about 340° F. may be used but for most purposes the curing times required at temperatures in the 300° F.–340° F. range are sufficiently rapid. As shown by the examples, a curing time of only a few minutes at such temperatures is sufficient. It will be appreciated that these short curing times are of great importance. Festooning and storage of the coated material in heated ovens for long periods, many hours in some cases, such as was necessary with many of the adhesives in use hitherto, is not required; and the cost of high-quality, abrasive-coated material is therefore materially reduced. Indeed, as explained above, following each adhesive coating the web is merely passed through a heated oven. The period of heating can be readily regulated by choice of a speed of web travel which leaves the coated web in the heating zone of the oven for the necessary period of time.

It has been found that abrasive-coated materials produced in accordance with the invention are very durable. As compared to similar materials produced with conventionally used adhesives such as phenolic resins, the novel materials produced with adhesives of the types herein described are more resistant to shock and less subject to chipping and cracking. The novel materials have a good appearance and the bonds with the abrasive grain and backings are not only very strong, but also resistant to abrasion and to attack by water, alkali solutions, and detergents such as are used in grinding fluids.

The finished, novel abrasive-coated webs of the present invention may simply be cut into sheets or strips for use with sanding blocks, reciprocating sanders and the like. Abrasive discs may be produced by dieing out ones of desired size from the webs. Other abrasive-coated articles may be formed from the webs in any conventional or desired way. For example, abrasive belts can be produced in accordance with the disclosure of U.S. Patent No. 2,391,731.

Tests have shown that abrasive-coated articles formed from abrasive-coated material according to the present invention are superior to those formed from known abrasive-coated materials. For example, in tests on steel comparing abrasive belts made from abrasive-coated cloth according to the present invention with abrasive belts made from conventional abrasive-coated cloth using a phenolic resin adhesive, it was found that the former removed over 44% more stock than the conventional belts in the same period of time. Similar superiority is found with abrasive discs and other abrasive articles formed from abrasive-coated materials according to the invention.

It will be recognized that any desired type of abrasive material such, for example, as silicon carbide, fused alumina, and zirconia as well as mixtures of these and/or other abrasive may be used in the production of abrasive coated materials in accordance with the present invention. The abrasives used may be of any desired and suitable grit sizes or mixtures thereof.

In addition to the filled or presized cotton drills used as a backing in Example 1 abrasive-coated material of the type with which the present invention is concerned may be produced with backings of other conventional fabrics, paper, which may be presized; vulcanized fiber and combinations of these materials such as are conventionally used in the abrasive industry. Open mesh fabrics, such as those disclosed in U.S. Patent No. 2,874,-

729 may also be used as backings in carrying out the invention. It has been found that excellent bonds between such backings and the abrasive particles are obtained with the adhesives herein described. The abrasive grain can be applied to the adhesive film on the backing web by any desired method. Thus, for example, instead of merely letting the granules fall on the adhesive-coated web, it may be applied thereto by electrodeposition or may be applied otherwise and oriented with an electric field.

In the foregoing description and the appended claims percentages specified are percentages by weight.

It will be understood that the invention as described above is susceptible to certain modifications and variations other than those specifically mentioned without departing from the teaching or spirit thereof. Accordingly, it is intended that the invention shall not be considered as limited to the precise procedure and materials described, but shall be construed as broadly as permitted by the appended claims.

I claim:

1. An abrasive coated material consisting of abrasive particles attached to a flexible backing by separately cured making and sand-sizing coatings of hardened adhesive, the adhesive in each said coating consisting essentially of a resin-forming polyepoxide; an amine curing agent therefor comprising at least one aromatic polyamine selected from the group consisting of orthophenylene diamine, metaphenylene diamine, paraphenylene diamine, 4,4-diamino diphenylmethane, 2,4-toluene diamine, 3,3-diamethoxybenzidine, and benzyl dimethylamine and at least one aliphatic polyamine selected from the group consisting of ethylene diamine, diethylene triamine, triethylene tetra-amine, tetra-ethylene pentamine, N-2-hydroxypropyl ethylene diamine, hydroxyethyl ethylene diamine, 3,3-aminobis-propyl-amine and menthane diamine, the said aliphatic polyamine in said amine curing agent comprising between about 20 parts and 57 parts per 100 parts by weight of the total amine curing agent, the total said curing agent in said coatings being substantially a stoichiometric amount based on the total said epoxide in said coatings; and 1 to 12% by weight of the total composition of a finely divided inert filler.

2. An abrasive-coated material as set forth in claim 1 in which at least most of the particles of said filler are less than 5 microns in diameter.

3. An abrasive coated material as claimed in claim 1 wherein said resin-forming liquid polyepoxide has an epoxy-functionality of at least two epoxy groups per molecule.

4. Process for producing an abrasive coated material consisting of abrasive particles attached to a flexible backing by a hardened adhesive, said material characterized by an exceptionally strong adhesive bond and an outstanding cutting rate, said process suitable for use on a continuous basis in a conventional apparatus without requiring festooning which comprises selecting a flexible backing material, applying to a surface of said backing material a coating of a making adhesive, said making adhesive consisting essentially of a liquid resin forming polyepoxide, an amine curing agent as defined in claim 1 and 1 to 12% by weight of the total composition of an inert filler, applying to said adhesive coating a coating of abrasive particles, curing said adhesive at an elevated temperature less than about 340° F. for a short period of time not exceeding about 10 minutes to form a partially bonded abrasive material, applying to the surface of said partially bonded abrasive material a coating of sand sizing adhesive, said sand sizing adhesive consisting essentially of a liquid resin-forming polyepoxide, an amine curing agent as defined in claim 1 and 1 to 12% by weight of the total composition of an inert filler, and curing said sizing adhesive at an elevated temperature less than about 350° F. for a short period of time not exceeding about 10 minutes.

References Cited by the Examiner

UNITED STATES PATENTS

| 2,322,156 | 6/43 | Oglesby | 51—298.1 |
| 2,506,486 | 5/50 | Bender et al. | 51—298 |
| 2,824,851 | 2/58 | Hall | 51—298 |
| 2,873,181 | 2/59 | Hanford | 51—301 |
| 2,982,752 | 5/61 | Phillips et al. | 51—298 |

ALEXANDER H. BRODMERKEL, Primary Examiner.

MORRIS LIEBMAN, Examiner.